US012324783B2

(12) United States Patent
Zhang

(10) Patent No.: US 12,324,783 B2
(45) Date of Patent: Jun. 10, 2025

(54) MASSAGE DEVICE AND MASSAGE METHOD

(71) Applicant: Xiaobin Zhang, Yingshan (CN)

(72) Inventor: Xiaobin Zhang, Yingshan (CN)

(*) Notice: Subject to any disclaimer, the term of this patent is extended or adjusted under 35 U.S.C. 154(b) by 0 days.

(21) Appl. No.: 18/807,997

(22) Filed: Aug. 18, 2024

(65) Prior Publication Data

US 2024/0407968 A1 Dec. 12, 2024

(51) Int. Cl.

| | |
|---|---|
| ***A61H 19/00*** | (2006.01) |
| ***A61H 23/00*** | (2006.01) |
| ***A61H 23/02*** | (2006.01) |

(52) U.S. Cl.

CPC ............ *A61H 19/40* (2013.01); *A61H 19/34* (2013.01); *A61H 23/00* (2013.01); *A61H 23/0254* (2013.01); *A61H 23/0263* (2013.01); *A61H 2201/0107* (2013.01)

(58) Field of Classification Search

CPC ........ A61H 19/00; A61H 19/30; A61H 19/34; A61H 19/40; A61H 19/44; A61H 21/00; A61H 23/00; A61H 23/02; A61H 23/0254; A61H 23/0263; A61H 2023/0272; A61H 2023/0281; A61H 2201/01; A61H 2201/0107; A61H 2201/0161; A61H 2201/1215; A61H 2201/1628; A61H 2201/163

See application file for complete search history.

(56) References Cited

U.S. PATENT DOCUMENTS

| | | | | |
|---|---|---|---|---|
| 7,993,262 | B2 * | 8/2011 | Cianfrani | A61H 19/50 600/38 |
| 10,265,239 | B2 * | 4/2019 | Pallarés Aniorte | A61H 23/00 |
| 2004/0030273 | A1 * | 2/2004 | Tucker | A61H 19/44 601/72 |
| 2007/0066919 | A1 | 3/2007 | Gueret | |
| 2008/0269553 | A1 * | 10/2008 | Nan | A61H 19/34 600/38 |
| 2014/0046127 | A1 * | 2/2014 | Topolovac | A61H 23/04 600/38 |
| 2014/0155225 | A1 * | 6/2014 | Sedic | A63B 24/0062 482/8 |
| 2014/0155794 | A1 | 6/2014 | Tambakis | |
| 2016/0008215 | A1 * | 1/2016 | Pfeiffer | A61H 23/02 600/38 |
| 2017/0290734 | A1 | 10/2017 | McCrea | |
| 2017/0367926 | A1 * | 12/2017 | Verreault | A61H 19/40 |
| 2024/0269037 | A1 * | 8/2024 | Peng | A61H 23/02 |

* cited by examiner

*Primary Examiner* — Colin W Stuart

(74) *Attorney, Agent, or Firm* — Yong Chen

(57) ABSTRACT

A massage device includes an outer housing, a control board arranged in the outer housing, a battery connected to the control board, and a control button connected to the control board and a charging port for charging the battery which are arranged on the outer housing. The outer housing is provided with an accommodation cavity, a contact massage portion is arranged in the accommodation cavity, the contact massage portion is connected to the outer housing by a main body, and the contact massage portion can completely enter a massage site for massage and can be pulled out from the massage site by the main body and placed in the accommodation cavity.

9 Claims, 9 Drawing Sheets

MASSAGE DEVICE AND MASSAGE METHOD

TECHNICAL FIELD

The present invention relates to the field of massage devices for adult products, and in particular, to a massage device and a massage method.

BACKGROUND

Due to psychological, physiological, menopausal, and living in different places factors, the female may suffer from a variety of adverse consequences such as sexual hypofunction, frigidity, and incongruous sexual life, which may affect physical and mental health of the female. Compared with drug treatment, physical therapy massagers are often used to improve the sexual function of the female. At present, the female massagers can be classified into traditional massagers and wearable massagers. Since the wearable massagers have the outstanding advantage of being free from the limitation of the use environment, and gradually become the main development direction of the female massagers. However, the existing wearable massager cannot completely enter the massage site for massage, and has a poor massage effect and poor use experience. Therefore, the improvements need to be made to the existing wearable massager.

SUMMARY

The technical problem to be solved by the present invention is that the existing wearable massager cannot completely enter the massage site for massage, and has a poor massage effect and poor use experience. Therefore, the improvements need to be made to the existing wearable massager. Aiming at the above defect in the prior art, a massage device and a massage method are provided.

To solve the above technical problem, the present invention adopts the following technical solutions.

A massage device is constructed, which comprises an outer housing, a control board arranged in the outer housing, a battery connected to the control board, and a control button connected to the control board and a charging port for charging the battery which are arranged on the outer housing, wherein the outer housing is provided with an accommodation cavity, a contact massage portion is arranged in the accommodation cavity, the contact massage portion is connected to the outer housing by a main body, and the contact massage portion can completely enter a massage site for massage and can be pulled out from the massage site by the main body and placed in the accommodation cavity.

A massage method is constructed, the massage method is based on the structure of the massage device, and the vibration mechanism drives the massage end to vibrate for massage.

The present invention has the beneficial effects that: the contact massage portion can completely enter into the massage site for massage, and the contact massage portion can be hidden after entering, so that the massage effect is more significant, and the privacy is stronger. The contact massage portion is driven by the vibration mechanism to achieve vibration massage. Vibration massage can be performed based on the massage requirements of different depths and sites. The contact massage portion is placed based on the requirements of different depths to achieve massage requirements of different depths. In addition, the vibration mechanism massages the outside of the massage site while vibrating, thereby improving the massage effect. Meanwhile, the contact massage portion is detachably connected to the outer housing, and the contact massage portion can also perform massage independently. This massage device is wearable as a whole and can be used after being worn, which is more convenient to use, and the massage effect after use is better and the experience is better.

DETAILED DESCRIPTION OF EMBODIMENTS

Figure 1:
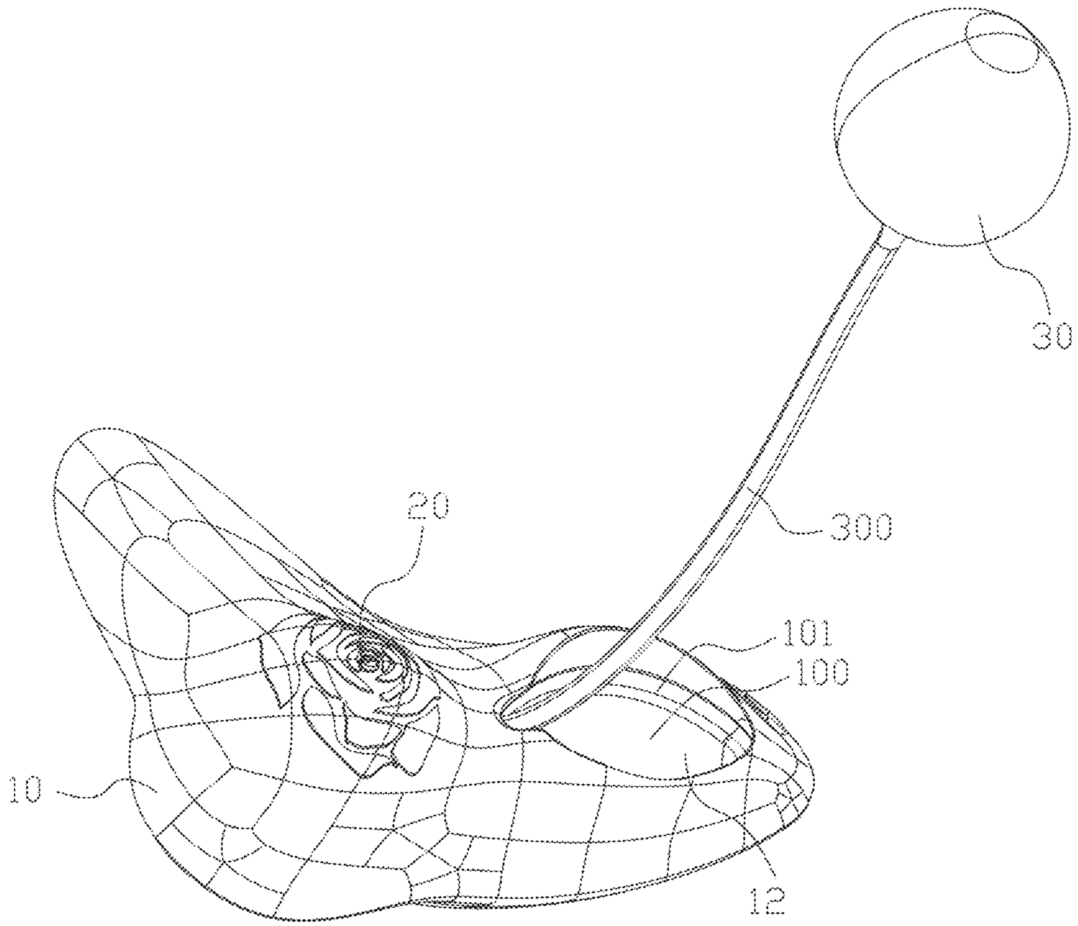
FIG. 1 is a three-dimensional structural diagram of a massage device according to the present invention.
Figure 2:
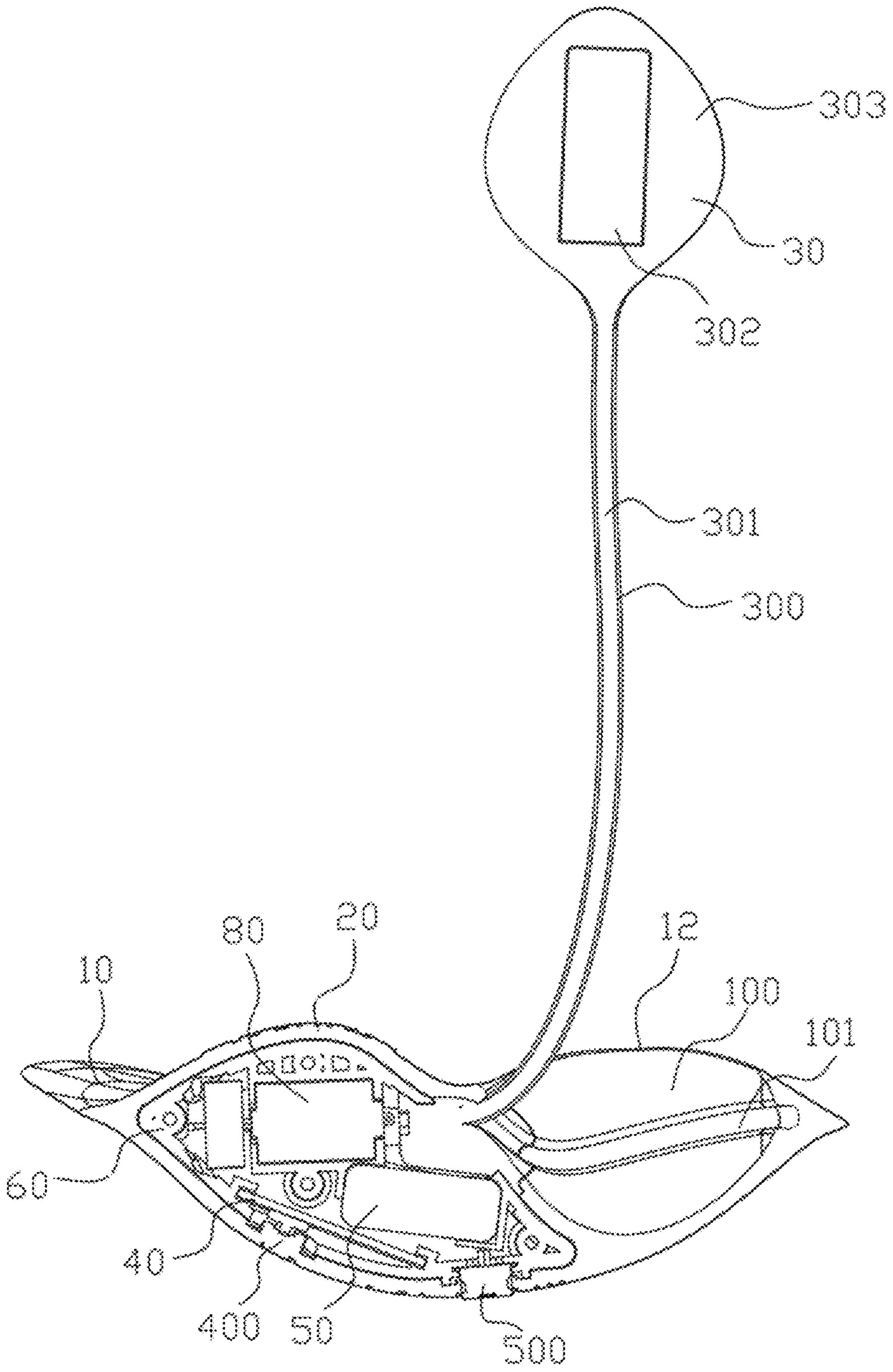
FIG. 2 is a cross-sectional structural diagram of a massage device according to the present invention.
Figure 3:
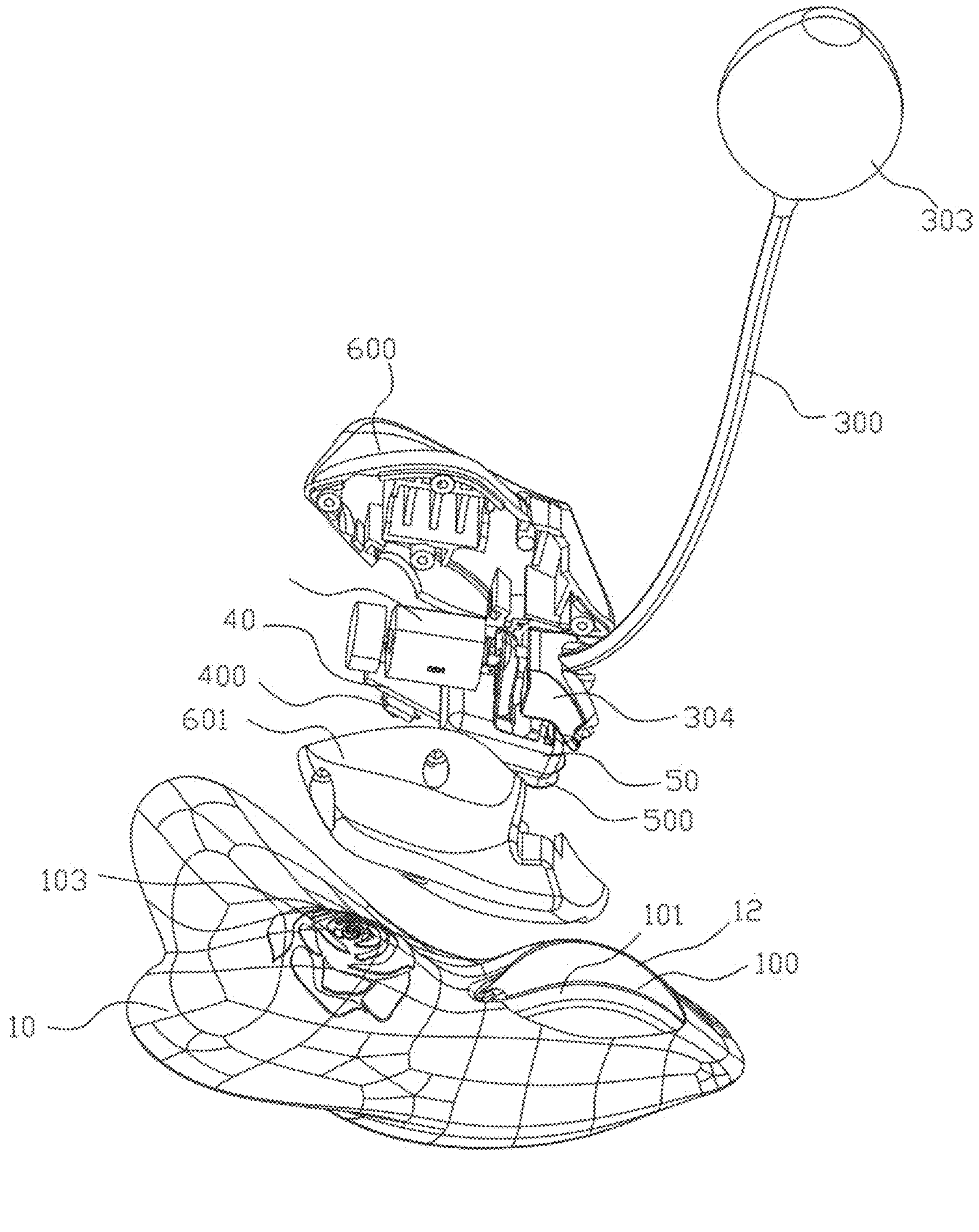
FIG. 3 is an exploded structural diagram of a massage device according to the present invention.

A massage device according to a preferred embodiment of the present invention, as shown in FIGS. 1-3, comprises an outer housing 10, an inner housing 60 arranged in the outer housing, a vibration mechanism 80 arranged in the inner housing, a control board 40 connected to the vibration mechanism, a battery 50 for supplying power to the vibration mechanism and the control board, a charging head 500 arranged on the outer housing for charging the battery, and a control button 400 for adjusting the operation mode of the massager. The massager further comprises a second massage portion 30 connected to the outer housing and a first massage portion 20 arranged on the outer housing. After the massager is worn on a specific site, the second massage portion extends into the massage site to perform vibration massage, and the first massager can perform vibration massage on the outside of the massage site, thereby improving the massage effect.

Figure 4:
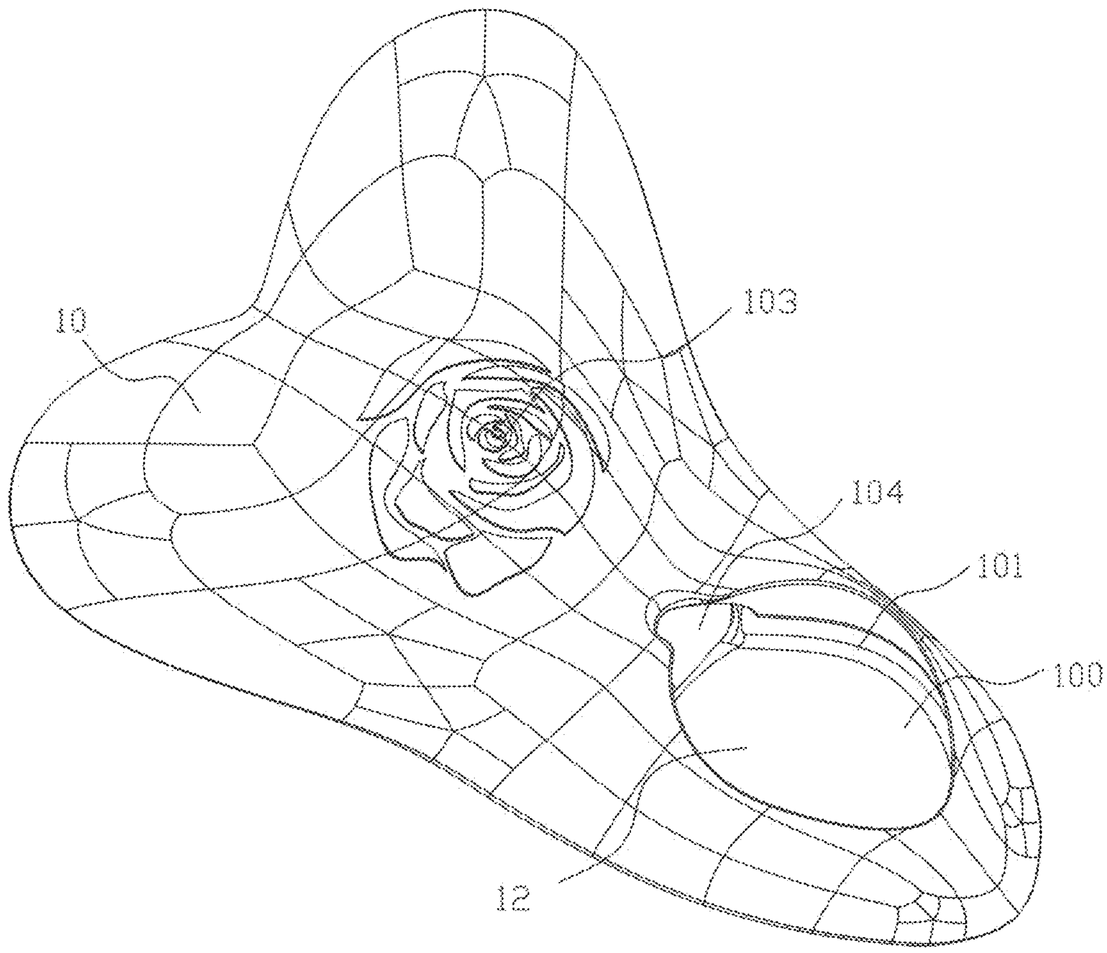
FIG. 4 is a structural diagram of an outer housing according to the present invention.

Specifically, as shown in FIG. 4, the interior of the outer housing 10 is hollow and divided into two groups of cavities, the vibration mechanism 80 is placed in a left cavity, and a protruding portion 103 is provided at the upper end of the left cavity of the outer housing corresponding to the vibration mechanism. When the vibration mechanism vibrates, the vibration is transmitted to the protruding portion, and the protruding portion vibrates to form the first massage portion to perform vibration massage on the outside of the massage site. A right cavity of the outer housing 10 forms an accommodation cavity 100 for accommodating the second massage portion, a connection port 104 is arranged between the left cavity and the right cavity, the second massage portion is partially placed in the left cavity and has a radius greater than the connection port, the second massage portion can be taken out from the accommodation cavity 100 and enter the massage site for massage, an accommodation cavity opening 12 is correspondingly arranged at an upper end of the accommodation cavity, and the second massage portion can be taken out by the accommodation cavity opening and enter the massage site for massage or enter the accommodation cavity by the accommodation cavity opening for storage.

Further, as shown in FIG. 3 and FIGS. 5 to 9, the inner housing 60 is composed of a left inner housing 600 and a right inner housing 601, and components such as the vibration mechanism and the battery are placed in the inner housings. The inner housing 60 is provided with a vibration mechanism fixing portion 602, the vibration mechanism is arranged in the fixing portion, the inner housing is also provided with a protruding portion 103 corresponding to the protruding portion of the outer housing, and a plurality of groups of vibration transmission ribs 603 are arranged between the vibration mechanism fixing portion and the protruding portion. Since the vibration transmission ribs are in contact with the vibration mechanism in the axial direction, when the vibration mechanism operates, the vibration is transmitted to the protruding portion by the vibration transmission ribs, and the protruding portion can vibrate with the vibration of the vibration mechanism. It should be noted that the vibration transmission ribs are only arranged in the left and right directions and the upper direction of the vibration mechanism, so that the first massage portion 20 formed by the protruding portion performs massage in the direction toward the massage site and in the left and right directions. To further improve the vibration transmission effect, a second cavity 604 is further arranged between the vibration mechanism fixing portion 602 and the inner housing, the vibration mechanism 80 comprises a vibration motor arranged in the vibration mechanism fixing portion and a rotating portion 801 connected to the vibration motor, the rotating portion is arranged in the second cavity, when the vibration motor vibrates to enable the protruding portion to vibrate for massage, the rotating portion also rotates to enable the area outside the second cavity to rotate for massage, and the massage area of the first massage portion is increased.

Figure 5:
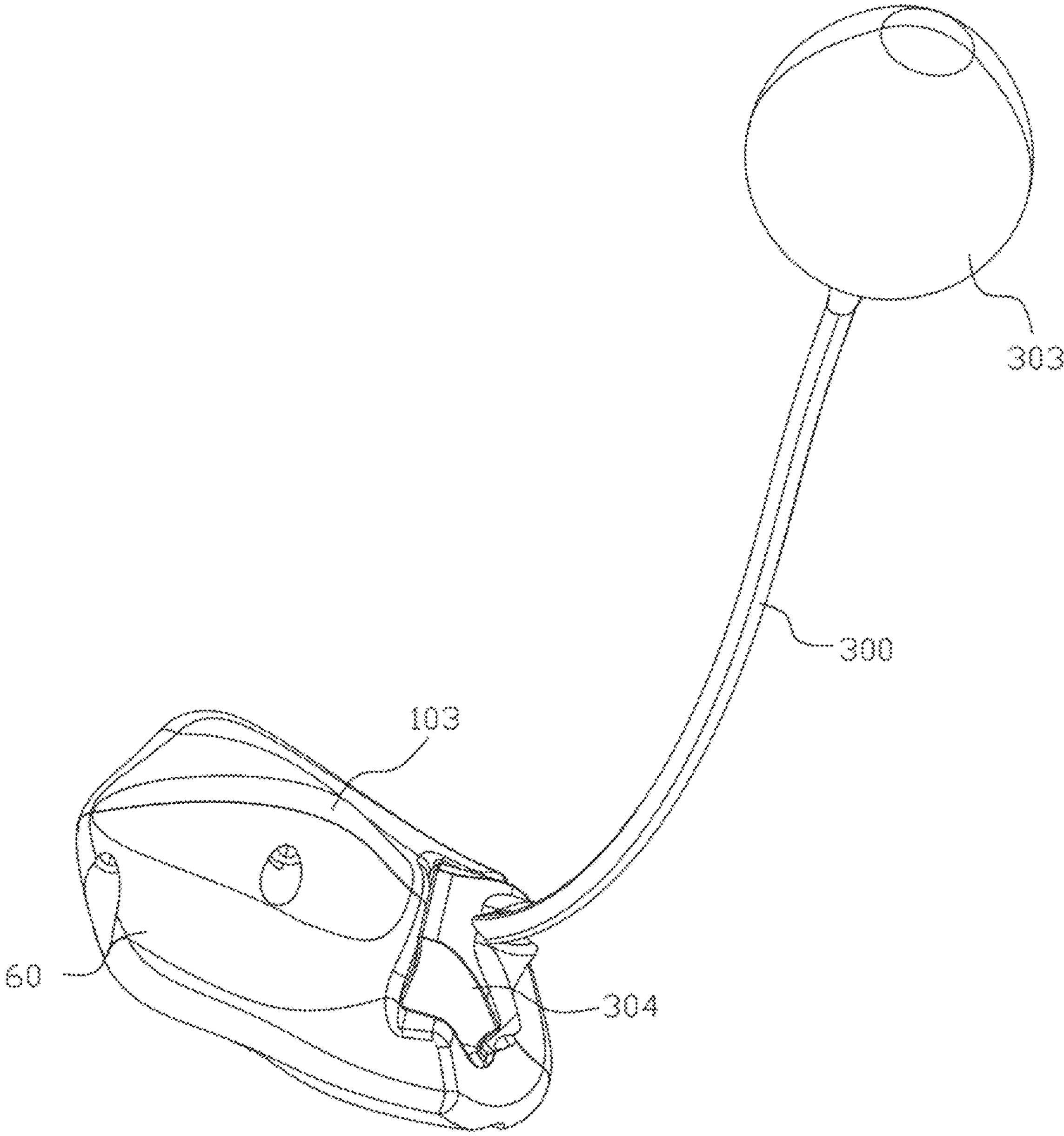
FIG. 5 is a structural diagram of a connection between an inner housing and a second massager according to the present invention.
Figure 6:
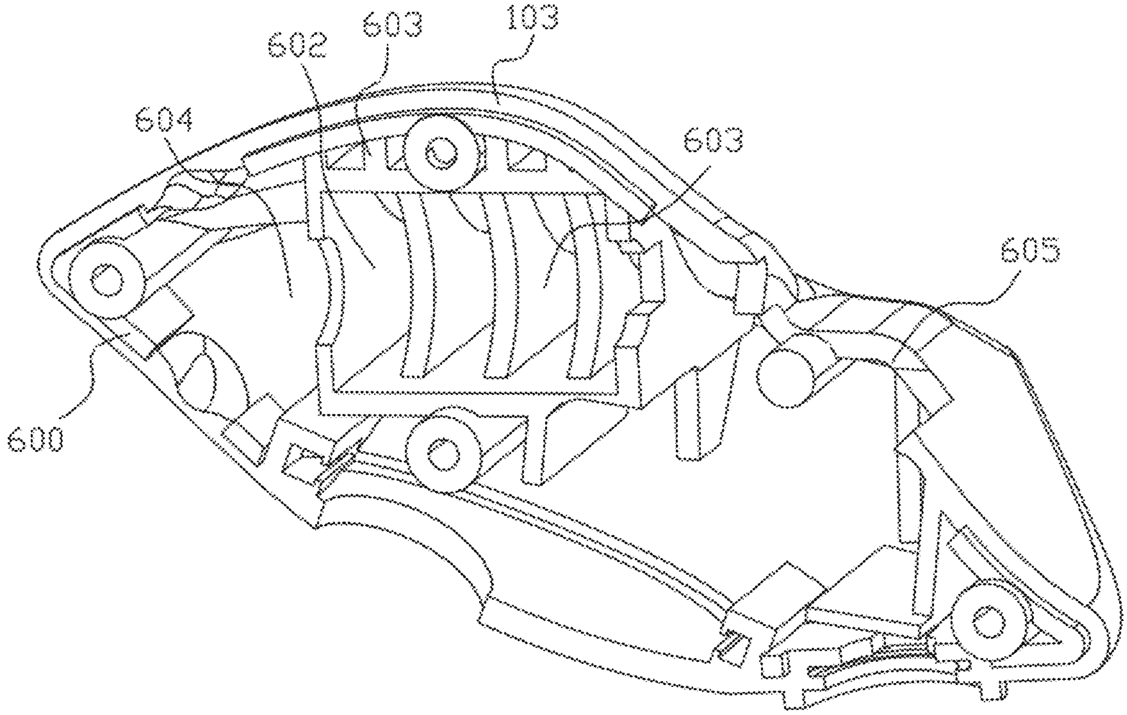
FIG. 6 is a structural diagram of a left inner housing according to the present invention.
Figure 7:
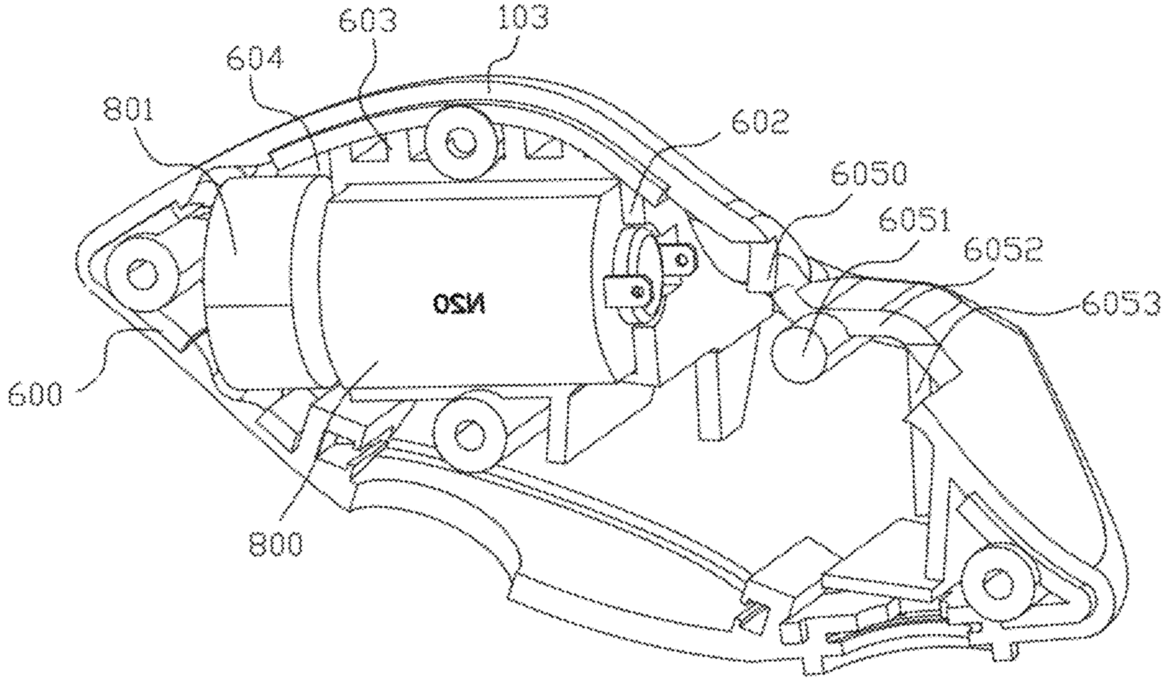
FIG. 7 is a structural diagram of a connection between a left inner housing and a vibration mechanism according to the present invention.
Figure 8:
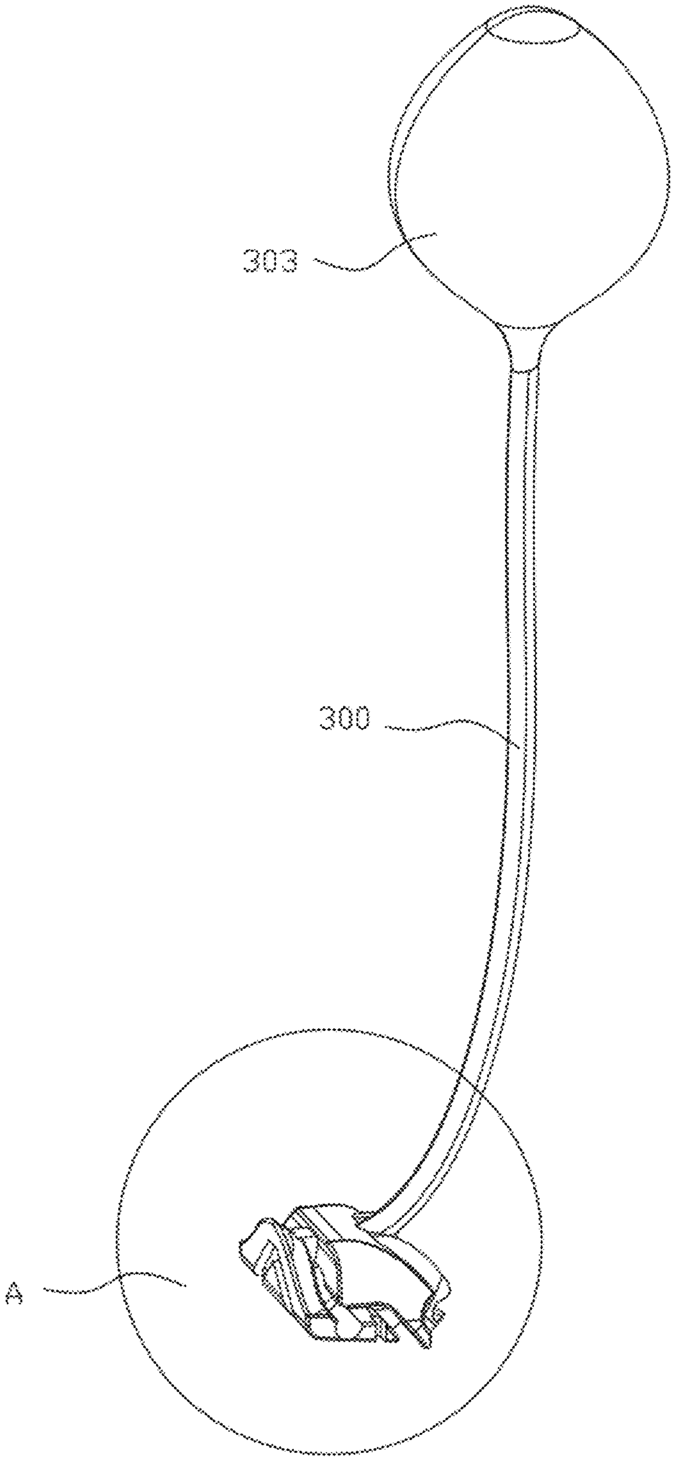
FIG. 8 is a structural diagram of a vibration mechanism according to the present invention.
Figure 9:
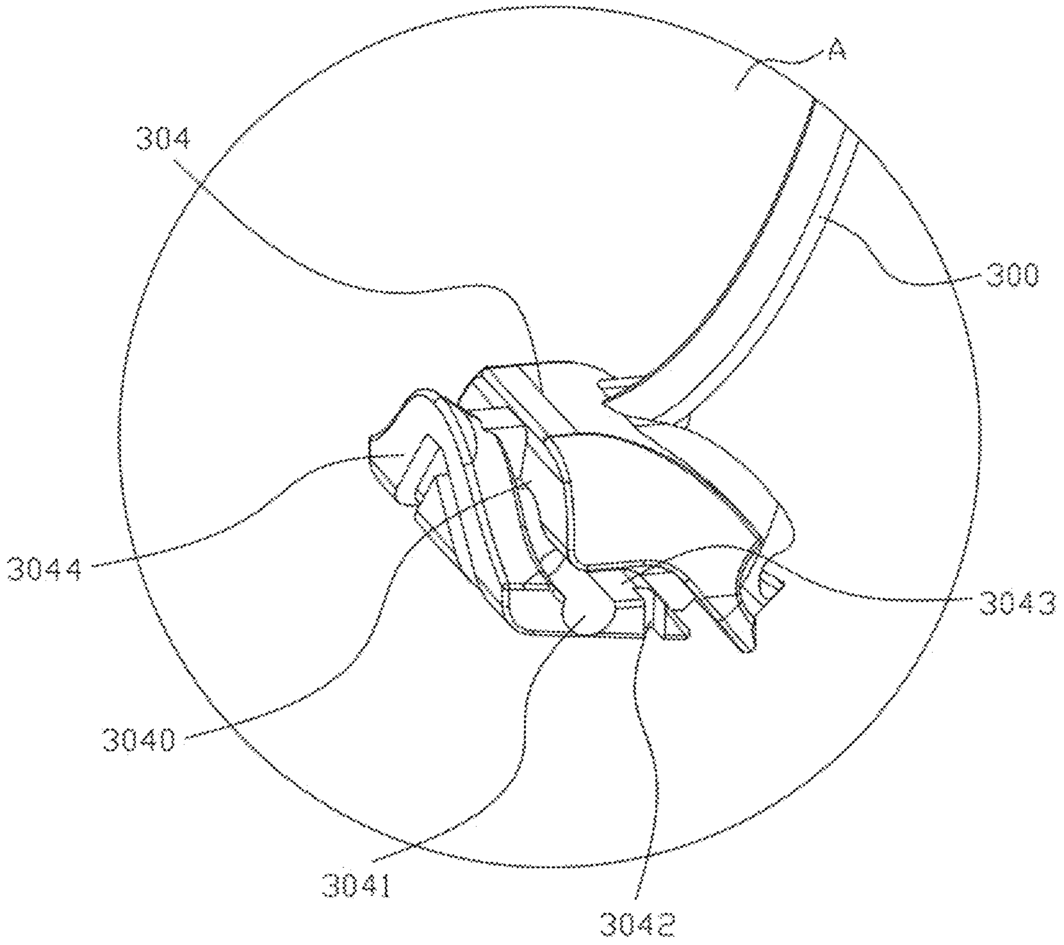
FIG. 9 is an enlarged schematic diagram of A in FIG. 8 according to the present invention.

Further, as shown in FIGS. 2 to 3 and 5, a connection member locking portion 605 is provided at the right side of the inner housing 60, the second massage portion 30 comprises a connection member 304 connected to the inner housing and a second massage end 303 for performing massage, a traction rope 300 is provided between the second massage end and the connection member, a vibration transmission line 301 is provided in the traction rope, a second vibration body 302 is provided in the second massage end, and when the vibration mechanism vibrates, the second vibration body vibrates by the vibration transmission line, thereby achieving vibration massage of the second massage end. The traction rope 300 may also be replaced by other connecting main body structures, which should also fall within the protection scope of the present invention.

Further, as shown in FIGS. 6 to 9, the connection member locking portion 605 comprises a first locking column 6050, and a third locking column 6052 and a fourth locking column 6053 integrally formed with the first locking column, the first locking column is further connected to a second locking column 6051, the connection member 304 is provided with a first locking groove 3040 corresponding to the first locking column, a second locking groove 3041 corresponding to the second locking column, a third locking groove 3042 corresponding to the third locking column, and a fourth locking groove 3043 corresponding to the fourth locking column, so that a connection column is connected to the inner housing. The connection column is further provided with a limiting block 3044, the limiting block is arranged at one side of the first locking column facing the vibration motor to limit the second massage portion, thereby preventing the second massage portion from falling off when the second massaging end enters the specific site for massage.

Further, in the present invention, the vibration of the second massage portion 30 is achieved by the vibration mechanism provided in the inner housing and transmitted to the second vibration body 302 by the vibration transmission lines 301, so that the second massage in end 303 performs vibration massage. The vibration mechanism can also be directly arranged in the second massage end, and the second massage end can directly vibrate to perform vibration massage by controlling the control button. Meanwhile, when an independent massage mechanism is provided in the second massage portion, and the second massage portion can also be detachably connected to the outer housing by a connection terminal. After the second massage portion is detached, the second massage portion can also perform massage work independently, so that the massage device can be used after being detached or mounted as a whole.

Further, the shape of the accommodation cavity opening and the shape of the second massage end in the present invention are not particularly limited, that is, the second massage end and the accommodation cavity opening may be in one of a circle shape, a semi-circle shape, an ellipse shape, a square shape, a rectangle shape, a triangle shape, a polygon shape, a D shape, a C shape, a kidney shape, a heart shape, a gourd shape and a bud shape; or in a combination of at least two of a circle shape, a semi-circle shape, an ellipse shape, a square shape, a rectangle shape, a triangle shape, a polygon shape, a D shape, a C shape, a kidney shape, a heart shape, a gourd shape and a bud shape. The wearable massager is worn, the second massage end is taken out from the accommodation cavity opening, and then the second massage end is inserted into the specific site, so that the completely inserted vibration massage can be achieved, and the second massage end can be placed into the accommodation cavity after the massage, which belongs to the protection scope of the present invention.

When used, the wearable massager is worn and placed at a specific site, the second massage portion is inserted into the specific site, the first massage portion is placed at the outside of the specific site, the vibration mechanism vibrates by the control button, the vibration of the vibration motor is transmitted to the protruding portion by the vibration transmission ribs, and the protruding portion vibrates to achieve vibration massage. Meanwhile, the rotating portion rotates to increase the vibration massage area of the protruding portion. The vibration mechanism is transmitted to the second vibration body by the vibration transmission lines, so that the second vibration end vibrates in the specific site for massages, the massage effect is better, the massage feeling is stronger, and the experience is better.

According to a massage method of a preferred embodiment of the present invention, the first massage portion and the second massage portion are driven by the vibration mechanism to perform vibration massage, wherein the second massage portion completely enters the massage site for massage and can achieve massage of different depths at the massage site, while the first massage portion performs massage on the outside of the massage site. This method is based on the structure of the above massager. The specific structure is as described above and details are not described herein again.

What is claimed is:

1. A massage device, comprising:

an outer housing, a control board arranged in the outer housing, a battery connected to the control board, and a control button connected to the control board and a charging port for charging the battery which are arranged on the outer housing, wherein the outer housing is provided with an accommodation cavity, a contact massage portion is arranged in the accommodation cavity, the contact massage portion is connected to the outer housing by a main body, and the contact massage portion can completely enter a massage site for massage and can be pulled out from the massage site by the main body and placed in the accommodation cavity, wherein the contact massage portion comprises a vibration body and a massage end sleeved on the vibration body, and the vibration body drives the massage end to vibrate for massage, and wherein a vibration mechanism is arranged in the outer housing, a vibration transmission line is arranged between the vibration mechanism and the vibration body, and the vibration mechanism enables the vibration body to vibrate by the vibration transmission line.

2. The massage device according to claim 1, wherein a protruding portion is arranged on one side of the outer housing and corresponds to the vibration mechanism, and when the vibration mechanism vibrates, the protruding portion is driven to vibrate to form a first massage portion for massage.

3. The massage device according to claim 2, wherein an inner housing is arranged inside the outer housing, the vibration mechanism is placed inside the inner housing, a protruding portion is correspondingly arranged on the inner housing, and the vibration of the vibration mechanism is transmitted to the protruding portion of the outer housing by the protruding portion of the inner housing.

4. The massage device according to claim 3, wherein the inner housing is provided with a vibration mechanism fixing portion, and the vibration mechanism is placed in the fixing portion.

5. The massage device according to claim 4, wherein the vibration mechanism fixing portion is provided with vibration transmission ribs in the vertical and/or horizontal directions, and the protruding portion of the inner housing transmits vibration by the vibration transmission ribs.

6. The massage device according to claim 4, wherein the vibration mechanism further comprises a rotating portion, and the inner housing is provided with a second cavity corresponding to the rotating portion.

7. The massage device according to claim 3, wherein the inner housing comprises a left inner housing and a right inner housing which are detachably connected, an opening is arranged on one side of the inner housing, and the contact massage portion is fixed by the opening.

8. The massage device according to claim 7, wherein the contact massage portion is connected to the inner housing by a connection member, one end of the main body passes through the opening and is connected to the connection member, and the other end of the main body is connected to the contact massage portion.

9. The massage device according to claim 8, wherein the connection member is provided with a locking groove, the inner housing is provided with a locking column corresponding to the locking groove, and the locking column is placed in the locking groove to connect and lock the connection member with the inner housing.

* * * * *